(12) United States Patent
Lee et al.

(10) Patent No.: US 7,598,795 B2
(45) Date of Patent: Oct. 6, 2009

(54) NEGATIVE VOLTAGE CONVERTER

(75) Inventors: Kung-hong Lee, Hsin-Chu (TW);
Cheng-chiu Pai, Hsin-Chu (TW);
Shi-hsiang Lu, Hsin-Chu (TW);
Wein-town Sun, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 11/833,889

(22) Filed: Aug. 3, 2007

(65) Prior Publication Data
US 2008/0252362 A1    Oct. 16, 2008

(30) Foreign Application Priority Data
Apr. 11, 2007    (TW)    ............... 96112783 A

(51) Int. Cl.
*G05F 1/10* (2006.01)
(52) U.S. Cl. ..................................... 327/536; 363/60
(58) Field of Classification Search ................. 327/536; 363/59–60
See application file for complete search history.

(56) References Cited

U.S. PATENT DOCUMENTS

| | | | |
|---|---|---|---|
| 5,282,170 A | | 1/1994 | Van Buskirk et al. |
| 5,754,476 A | * | 5/1998 | Caser et al. ............ 365/185.29 |
| 5,818,758 A | * | 10/1998 | Wojciechowski ...... 365/185.18 |
| 5,914,632 A | | 6/1999 | Fotouhi et al. |
| 6,118,329 A | | 9/2000 | Jin |
| 6,147,547 A | | 11/2000 | Ogura et al. |
| 6,175,264 B1 | * | 1/2001 | Jinbo ......................... 327/536 |
| 6,229,379 B1 | | 5/2001 | Okamoto |
| 6,452,438 B1 | * | 9/2002 | Li .............................. 327/536 |

(Continued)

FOREIGN PATENT DOCUMENTS

TW    393644    6/2000

(Continued)

OTHER PUBLICATIONS

John F. Dickson, "On-chip high-voltage generation in MNOS integrated circuits using an improved voltage multiplier technique," IEEE J. Solid-State Circuits, vol. SC-11, pp. 374-378, Jun. 1976.

*Primary Examiner*—Lincoln Donovan
*Assistant Examiner*—Thomas J Hiltunen

(57) ABSTRACT

A negative voltage converter includes six transistors. A first end and a control end of a first transistor are coupled to a signal input. A first end of a second transistor is coupled to the signal input, and a control end of which is coupled to a first clock and the first transistor. A first end of a third transistor is coupled to the signal input, a control end of the third transistor is coupled with a second clock and the second transistor. A first end of a fourth transistor is coupled to the second end of the third transistor, a control end of which is coupled with the first clock and the third transistor. A first end of a fifth transistor is coupled to the second end of the third transistor, and a control end of which is coupled with the second clock and the fourth transistor A first end of a sixth transistor is coupled to the second end of the third transistor, and a control end of which is coupled with the first clock and the fifth transistor.

16 Claims, 8 Drawing Sheets

U.S. PATENT DOCUMENTS

| | | | |
|---|---|---|---|
| 6,496,055 B2 * | 12/2002 | Li | 327/536 |
| 6,642,773 B2 | 11/2003 | Lin et al. | |
| 6,674,317 B1 | 1/2004 | Chou | |
| 6,690,227 B2 * | 2/2004 | Lee et al. | 327/536 |
| 6,736,474 B1 * | 5/2004 | Tiede | 327/536 |
| 6,803,807 B2 | 10/2004 | Fujiyama et al. | |
| 6,812,773 B1 | 11/2004 | Chou | |
| 6,819,158 B2 | 11/2004 | Mizuno et al. | |
| 6,980,045 B1 * | 12/2005 | Liu | 327/536 |
| 7,030,683 B2 * | 4/2006 | Pan et al. | 327/536 |
| 7,323,926 B2 * | 1/2008 | Chen et al. | 327/536 |
| 2004/0055963 A1 * | 3/2004 | Toyozawa et al. | 210/744 |
| 2005/0030086 A1 | 2/2005 | Sim et al. | |
| 2005/0048763 A1 | 3/2005 | Tzou et al. | |
| 2005/0088207 A1 | 4/2005 | Rader et al. | |
| 2008/0079480 A1 * | 4/2008 | Utsunomiya | 327/536 |

FOREIGN PATENT DOCUMENTS

| | | |
|---|---|---|
| TW | 427070 | 3/2001 |
| TW | 428362 | 4/2001 |
| TW | 556210 | 10/2003 |
| TW | 222704 | 10/2004 |

* cited by examiner

NEGATIVE VOLTAGE CONVERTER

BACKGROUND OF THE INVENTION

1. Field of the Invention

The present invention relates to a negative voltage converter, and more particularly to a negative voltage converter using P-type thin film transistors (P-type TFTs).

2. Description of the Related Art

Referring to FIG. 1 and FIG. 2, FIG. 1 is a circuit diagram of a negative voltage converter 10 using P-type TFTs according to prior art. FIG. 2 shows a relationship of voltage applied on a node X depicted in FIG. 1 varied with a threshold voltage Vth of the transistor 16. The Negative voltage converter 10, using P-type Thin Film Transistors (P-type TFTs), is capable of transforming an input positive voltage or zero voltage into a negative direct current (DC) voltage to be desired by a circuit or a component. The negative converter 10 comprises an input circuit 12 and a voltage amplifying circuit 14. The input circuit 12 comprises a P-type TFT 16 and a capacitor 18 electrically coupled to a clock signal CLK. The voltage amplifying circuit 14 may be a P-type TFT. Input of the input circuit 12 is 0V, and clock signal CLK is a square wave with amplitude between 0 and 5V.

However, a difference in P-type TFT fabrication process may result in different threshold voltage of P-type TFT. As can be seen in FIG. 2, the curves 51, 52, 53, 54 respectively represent waveforms on the node X corresponding to various threshold voltages −1V, −2V, −3V, −4V. Obviously, different threshold voltage Vth causes a significant output deviation in output waveform on node X.

Referring to FIG. 1 in conjunction with FIG. 3, FIG. 3 illustrates the negative voltage converter 10 producing output voltage $V_{OUT}$ based on various threshold voltages. As shown in FIG. 3, the curves 61, 62, 63, 64 respectively represent waveform of voltage $V_{OUT}$ dependent on various threshold voltage of P-type TFT of −1V, −2V, −3V, −4V. If the voltage applied on the node X is a square wave with 0∼−5V, the difference of the output voltage $V_{OUT}$ varied with different threshold voltage is approximately 3V. In other words, output of each input circuit 12 and voltage amplifying circuit 14 is varied as the threshold voltage of the P-type TFTs fabricated by using different processes. As a result, a deviation of output voltage is accumulated as a use number of input circuits 12 and voltage input circuits 14.

For example, two negative voltage converters are used in a circuit, and each converter comprises an input circuit and two voltage amplifying circuits. One converter employs P-type TFTs has a threshold voltage of −1V and the other employs P-type TFTs has a threshold voltage of −4V on account of different fabrication processes. Since an output deviation of each input circuit and voltage amplifying circuit is approximately 3V, a total deviation of output voltage of the entire negative voltage converter 10 will increase up to 9V. Such deviation directly influences on an operation subsequent stage of circuits and components, increasing complexity of design, and reducing yield of products accordingly.

Therefore, it is necessary to develop a negative voltage converter capable of supplying a negative voltage independent of a threshold voltage of P-type TFTs.

SUMMARY OF THE INVENTION

It is therefore an object of the present invention to provide a negative voltage converter using a P-type TFT independent of threshold voltage.

Briefly summarized, a negative voltage converter comprises a signal input end, a signal output end, a first transistor, a second transistor, a third transistor, a fourth transistor, a fifth transistor, and a sixth transistor. The first transistor comprises a first end, a second end, and a control end, the first end and the control end being electrically coupled to the signal input end. The second transistor comprises a first end, a second end, a control end, wherein the first end of the second transistor is electrically coupled to the signal input end, and the control end of the second transistor is electrically coupled to a first clock signal and the second end of the first transistor. The third transistor comprises a first end, a second end, a control end, wherein the first end of the third transistor is electrically coupled to the signal input end, the control end of the third transistor is electrically coupled with a second clock signal and the second end of the second transistor. The fourth transistor comprises a first end, a second end, a control end, wherein the first end of the fourth transistor is electrically coupled to the second end of the third transistor, the control end of the fourth transistor is electrically coupled with the first clock signal and the second end of the third transistor. The fifth transistor comprises a first end, a second end, a control end, wherein the first end of the fifth transistor is electrically coupled to the second end of the third transistor, the control end of the fifth transistor is electrically coupled with the second clock signal and the second end of the fourth transistor. The sixth transistor comprises a first end, a second end, a control end, wherein the first end of the sixth transistor is electrically coupled to the second end of the third transistor, the control end of the sixth transistor is electrically coupled with the first clock signal and the second end of the fifth transistor.

According to the present invention, a negative voltage converter comprises a signal input end, a signal output end, an input circuit, a plurality of first voltage amplifying circuits, and a plurality of second voltage amplifying circuits. The input circuit comprises a first transistor, a second transistor, and a third transistor. The first transistor comprises a first end, a second end, and a control end, the first end and the control end being electrically coupled to the signal input end. The second transistor comprises a first end, a second end, a control end, wherein the first end of the second transistor is electrically coupled to the signal input end, and the control end of the second transistor is electrically coupled to a first clock signal and the second end of the first transistor. The third transistor comprises a first end, a second end, a control end, wherein the first end of the third transistor is electrically coupled to the signal input end, the control end of the third transistor is electrically coupled with a second clock signal and the second end of the second transistor. Each first voltage amplifying circuits comprises a first input end electrically coupled to the first clock signal, a first output end, a fourth transistor, a fifth transistor and a sixth transistor. The fourth transistor comprises a first end, a second end, a control end, wherein the first end and control ends of the fourth transistor are electrically coupled to the first input end. The fifth transistor comprises a first end, a second end, a control end, wherein the first end of the fifth transistor is electrically coupled to the first input end, and the control end of the fifth transistor is electrically coupled with a third clock signal and the second end of the fourth transistor. The sixth transistor comprises a first end, a second end, and a control end, wherein the first end of the sixth transistor is electrically coupled to the first input end, the control end of the sixth transistor is electrically coupled with a fourth clock signal and the second end of the fifth transistor. Each second voltage amplifying circuit comprises a second input end electrically coupled to the second clock signal, a second output end, a seventh transistor, an eighth transistor, and a ninth transistor. The seventh transistor comprises a first end, a second end, a control end, wherein the first end and control ends of the seventh transistor are electrically coupled to the second input end. The eighth transistor comprises a first end, a second end, a control end, wherein the first end of the eighth transistor is electrically coupled to the second input end, and the control end of the eighth transistor is electrically coupled with a fifth clock signal and the second end of the seventh transistor. The ninth transistor comprises a first end, a second end, a control end, wherein the first end of the ninth transistor is electrically coupled to the second input end, the second end of the ninth transistor is electrically coupled to the second output end, and the control end of the ninth transistor is electrically coupled with a sixth clock signal and the second end of the eighth transistor. The first input end of one of the plurality of first voltage amplifying circuits is electrically coupled to the signal output end of the input circuit or the second output end of one of the plurality of second voltage amplifying circuits, the first output end of one of the plurality of first voltage amplifying circuits is electrically coupled to the signal output end of the input circuit or the second input end of one of the plurality of second voltage amplifying circuits These and other objectives of the present invention will become apparent to those of ordinary skill in the art after reading the following detailed description of the preferred embodiment that is illustrated in the various figures and drawings.

DETAILED DESCRIPTION OF THE INVENTION

Figure 1:
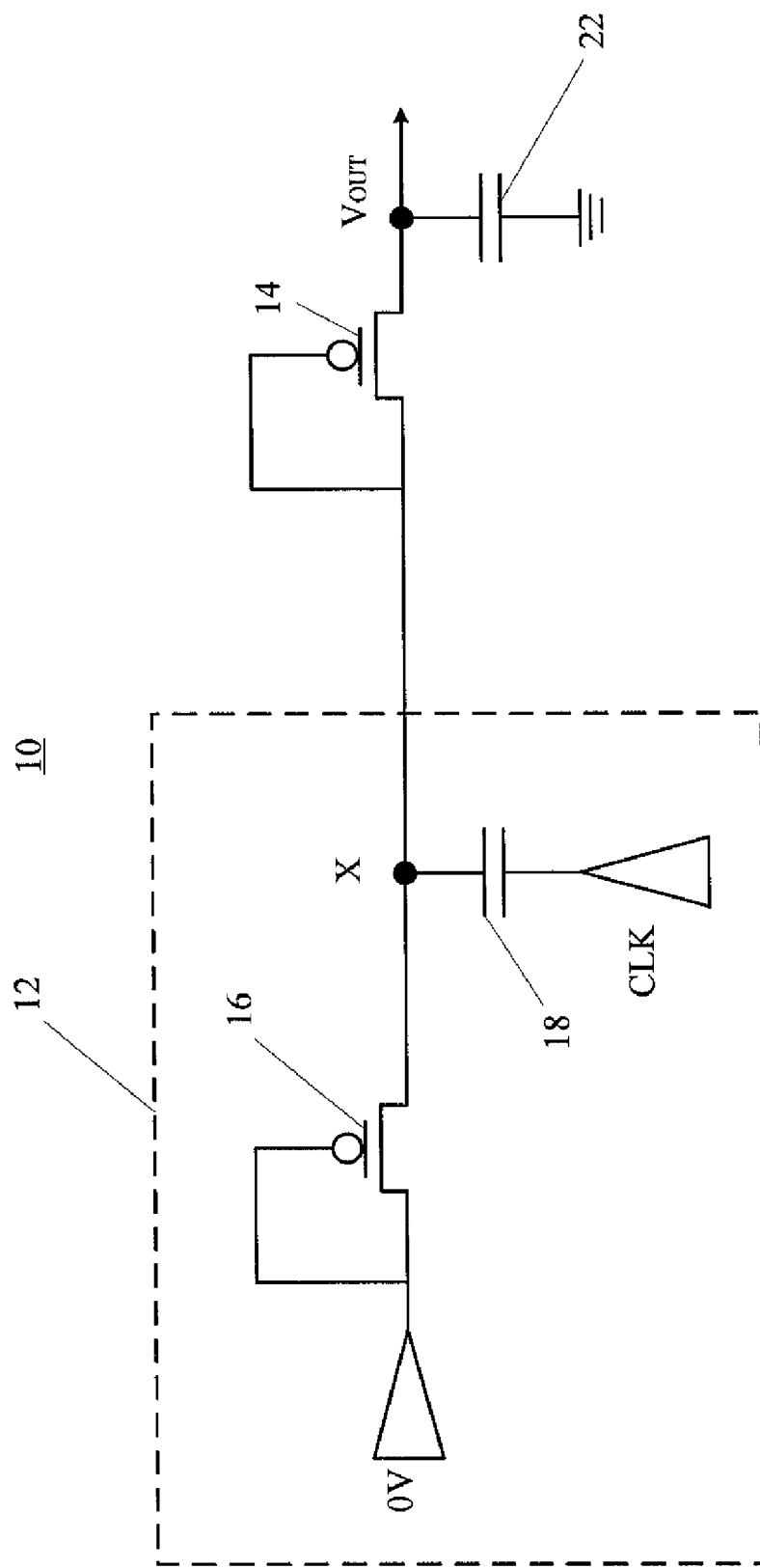
FIG. 1 is a circuit diagram of a negative voltage converter 10 using P-type TFTs according to prior art.
Figure 2:
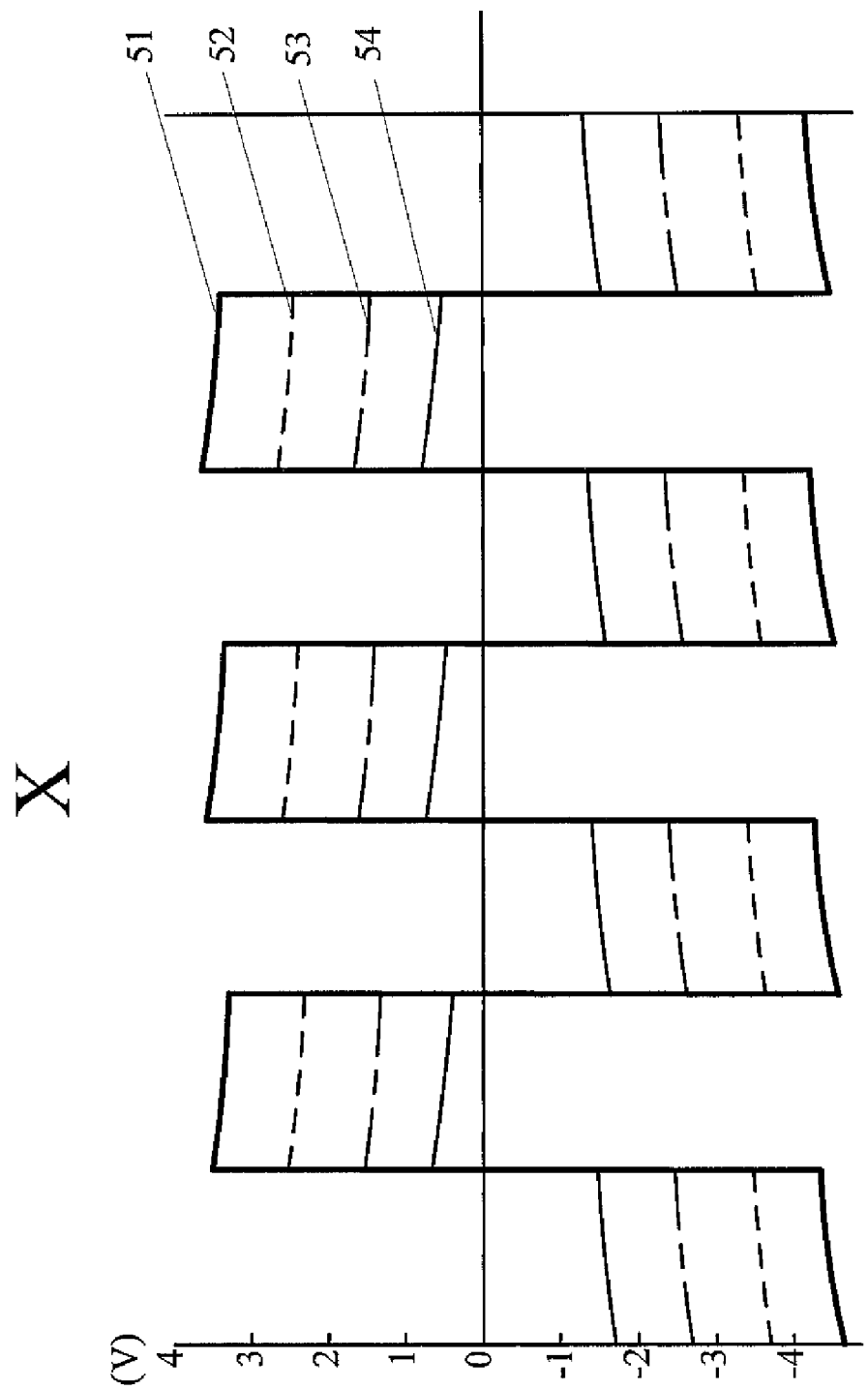
FIG. 2 shows a relationship of voltage applied on a node X depicted in FIG. 1 varied with a threshold voltage Vth of the transistor.
Figure 3:
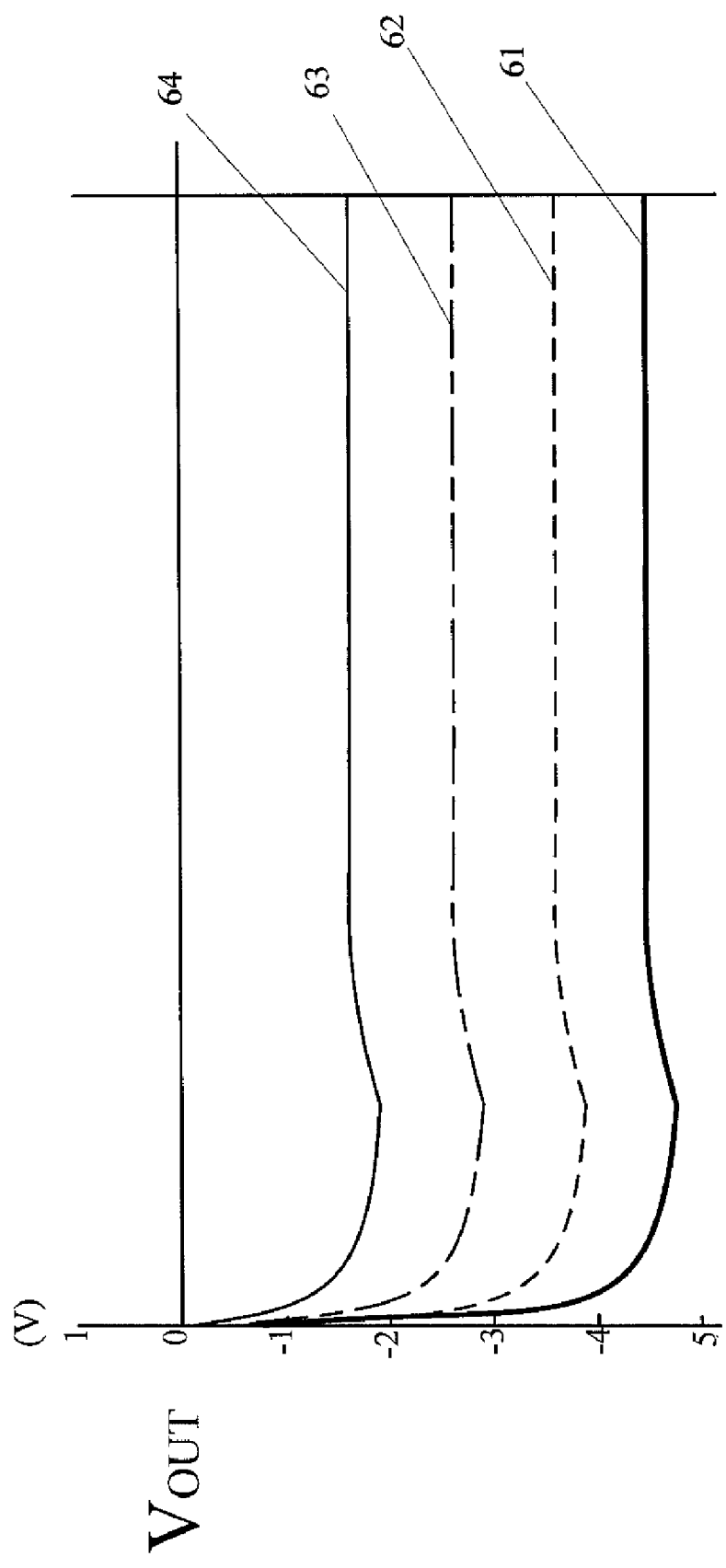
FIG. 3 illustrates the negative voltage converter 10 producing output voltage $V_{OUT}$ based on various threshold voltages.
Figure 4:
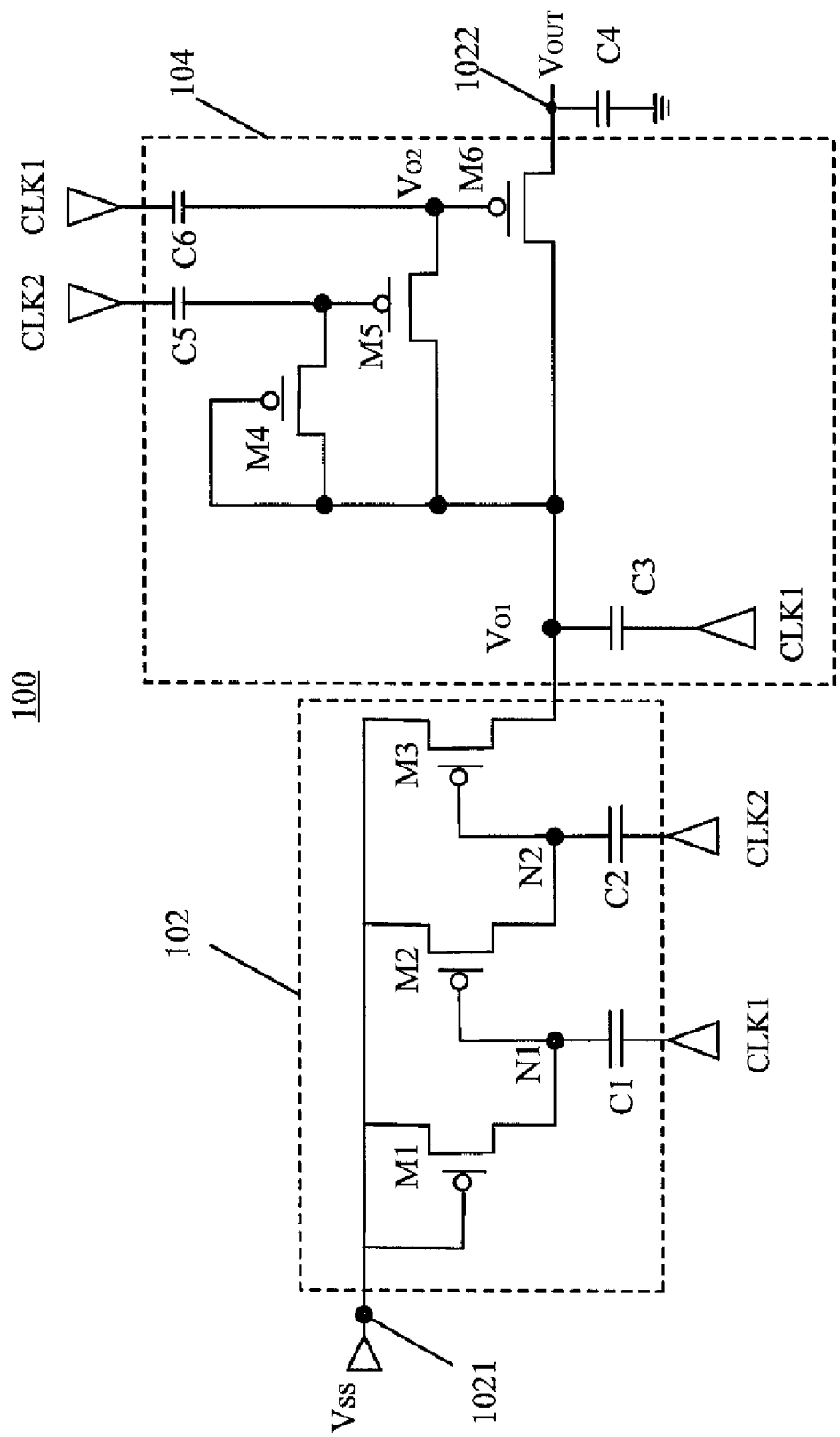
FIG. 4 shows a circuit diagram of a negative voltage converter according to a first preferred embodiment of the present invention.

FIG. 4 shows a circuit diagram of a negative voltage converter 100 according to a first preferred embodiment of the present invention. The negative voltage converter 100 comprises an input circuit 102 for delivering a DC voltage Vss applied on a signal input end 1021 to the voltage amplifying circuit 104, and a voltage amplifying circuit 104 for amplifying the DC voltage Vss to a required negative voltage at a signal output end 1022.

The voltage amplifying circuit 102 comprises a first transistor M1, a second transistor M2, a third transistor M3, each of which may be implemented by a P-type TFT. A control end of the first transistor M1 connects with the signal input end 1021 of the negative voltage converter 100. A first end of the first transistor M1 is electrically coupled to the signal input end 1021. A first end of the second transistor M2 is also electrically coupled to the signal input end 1021. A control end of the second transistor M2 is electrically coupled to a second end of the first transistor M1. The control end of second transistor M2 is also electrically coupled to a first clock signal CLK1 by means of a capacitor C1. A first end of the third transistor M3 is electrically coupled to the signal input 1021, and a control end of the third transistor M3 is electrically coupled to a second end of the second transistor M2. The control end of third transistor M3 is also electrically coupled to the clock signal CLK2 by means of a capacitor C2. The phase difference between clock signals CLK1 and CLK2 is 180°.

Referring to FIG. 4, the phase difference between clock signals CLK1 and CLK2 is 180°, so the first clock signal CLK1 is at low voltage level ($V_L$) while the second clock signal CLK2 is at high voltage level ($V_H$). On the contrary, the first clock signal CLK1 is at high voltage level ($V_H$), while the second clock signal CLK2 is at low voltage level ($V_L$). In this embodiment, the voltage level $V_H$ equals to 5V, and voltage level $V_L$ equals to 0V. As used herein, values of voltage level $V_H$ and $V_L$ are used only to facilitate understanding of the illustrative embodiments in connection with the figures and those terms should not to be construed to limit the scope of the invention unless explicitly required. By capacitor coupling effect, the clock signals CLK1 and CLK2 by means of the capacitors C1 and C2 reduces the voltage Va1 and Va2 applied on the control ends of the second transistor M2, and the third transistor M3 respectively, i.e. Vss>min(Va1)>min(Va2). Therefore, the minimum of voltage Va2 is far less than the input voltage Vss. As a result, the input voltage Vss is fed to the voltage amplifying circuit 104 without being effected by different fabrication processes.

The voltage amplifying circuit 104 comprises a fourth transistor M4, a fifth transistor M5, and a sixth transistor M6. The transistors M4-M6 may be implemented by P-type TFT. A first end of the fourth transistor M4 electrically couples to the second end of the third transistor M3. The control end of the fourth transistor M4 electrically couples with the second end of the third transistor M3, and the clock signal CLK1 by means of the capacitor C3. A first end of the transistor M5 electrically couples to second end of the third transistor M3. The control end of the transistor M5 electrically couples to the second end of the fourth transistor M4 and the second clock signal CLK2 by means of a capacitor C5. The first end of transistor M6 electrically couples to the second end of the third transistor M3. The second end of the transistor M6 electrically couples to the signal output end 1022. The control end of the transistor M6 electrically couples with the second end of the transistor M5 and the first clock signal CLK1 by means of the capacitor C6.

Figure 5:
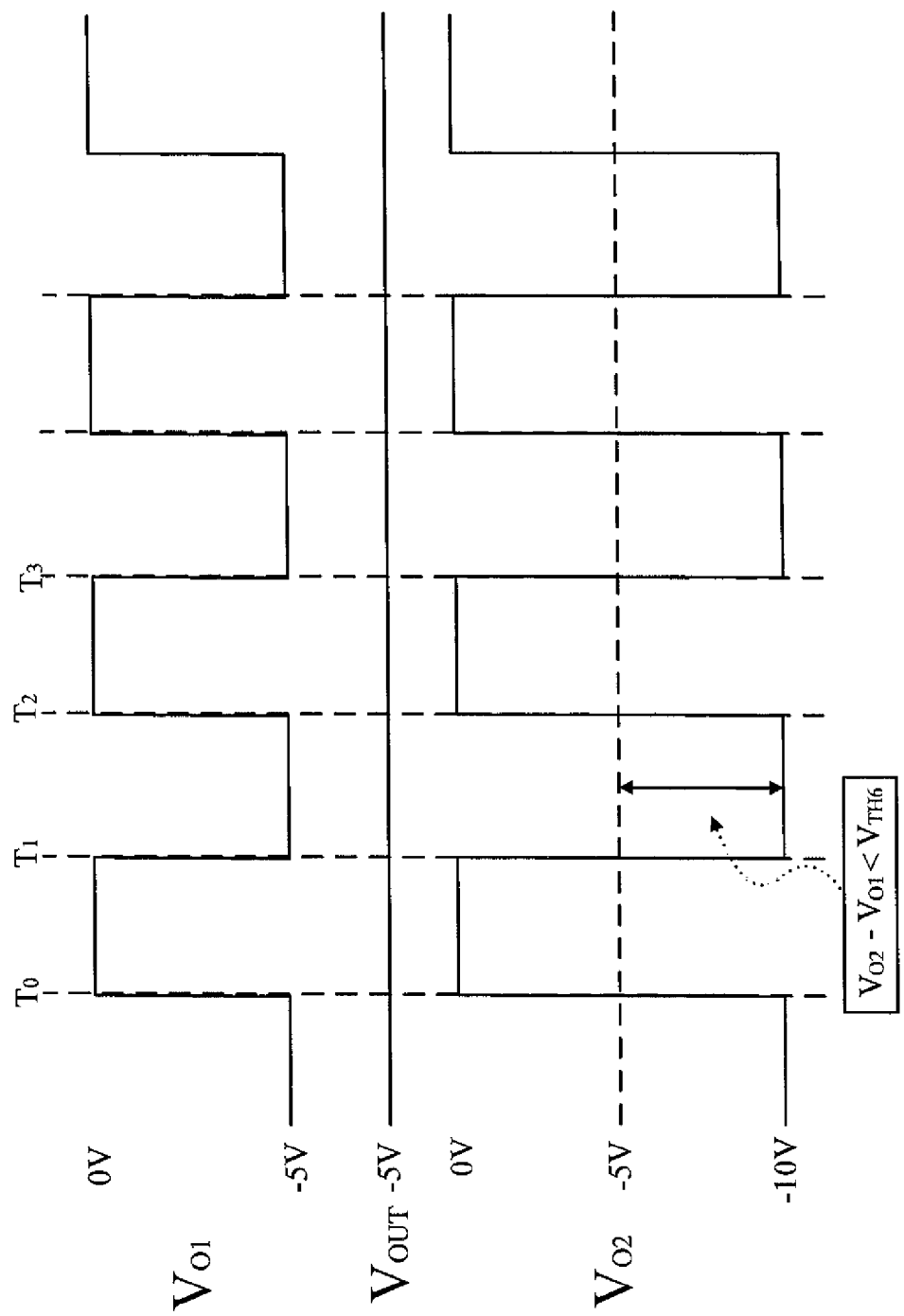
FIG. 5 shows respective waveforms $V_{O1}$, $V_{O2}$, $V_{out}$ of the first end, second and control ends of the sixth transistor M6 depicted in FIG. 4.

Referring to FIG. 4 in conjunction with FIG. 5, FIG. 5 shows respective waveforms $V_{O1}$, $V_{O2}$, $V_{out}$ of the first end, second and control ends of the sixth transistor M6 depicted in FIG. 4. When voltage $V_{O2}$ is higher than threshold voltage $V_{TH6}$ of the sixth transistor M6, the relationship among the first end, second end, and control end of sixth transistor M6 represent as:

$V_{OUT} \approx V_{O1}$, when $|V_{O2}| - |V_{TH6}| > |V_{O1}|$, $V_{OUT} \approx V_{O2} - V_{TH6}$, when $|V_{O2}| - |V_{TH6}| < |V_{O1}|$.

If desiring voltage $V_{OUT}$ applied on the signal output end 1022 close to the low voltage level of the voltage $V_{O1}$, independent of the threshold voltage $V_{TH6}$, the low voltage level of the voltage $V_{O2}$ should meet a criteria: $|V_{O2}|>|V_{O1}|+|V_{TH6}|$.

As shown in FIG. 5, during time period T0-T1, voltage $V_{O1}$ is at the high voltage level and equals to voltage $V_{O2}$, so that the sixth transistor M6 is switch-off, and the voltage $V_{O1}$ fails to deliver to signal output end 1022. For example, if the high voltage level of voltage $V_{O1}$ is 0V, the high voltage level of voltage $V_{O2}$ is also 0V. Therefore, the sixth transistor M6 is switch-off and the voltage $V_{O1}$ doesn't output to signal output end 1022.

During time period T1-T2, the voltage $V_{O1}$ is at low voltage level, and the voltage $V_{O2}$ is lower than the voltage $V_{O1}$ by an amplitude of the first clock signal CLK1, i.e. $V_H-V_L$. For example, if the low voltage level of voltage $V_{O1}$ is −5V and the amplitude of the first clock signal CLK1 equals to 5V ($=V_H-V_L$), the low voltage level of the voltage $V_{O2}$ is about −10V. As a result, even if a difference of the threshold voltage of the sixth transistor M6 exists, the low voltage level of the voltage $V_{O2}$ still meet the criteria: $|V_{O2}|>|V_{O1}|+|V_{TH3}|$. So, the output voltage $V_{OUT}$ can be maintained at a constant voltage of −5V.

Figure 6:
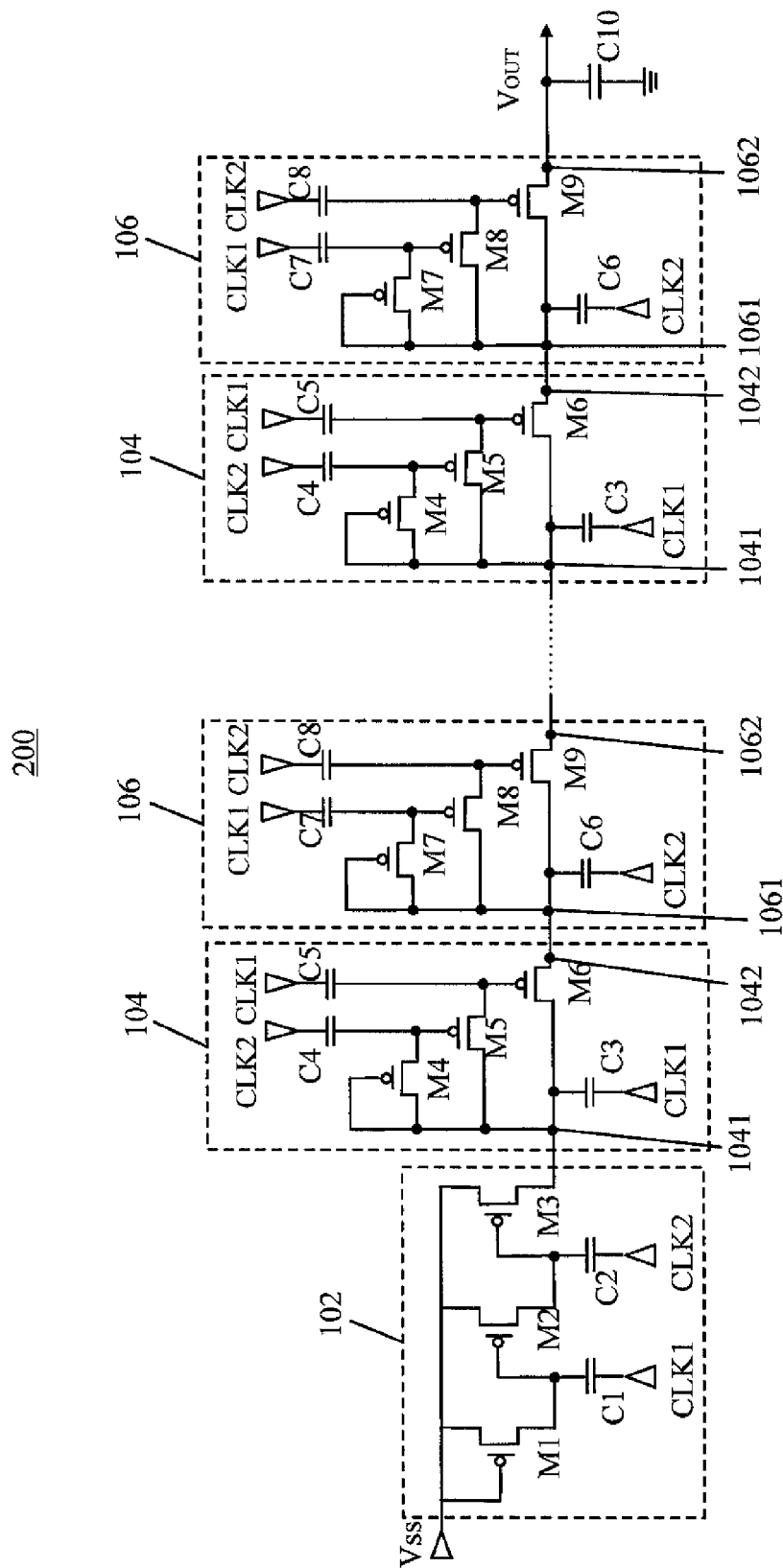
FIG. 6 shows a circuit diagram of a negative voltage converter according to a second embodiment of the present invention.

FIG. 6 shows a circuit diagram of a negative voltage converter 200 according to a second embodiment of the present invention. The negative converter 200 comprises a signal input end, a signal output end, an input circuit 102, a plurality of first voltage amplifying circuits 104, and a plurality of second voltage amplifying circuits 106. The plurality of first voltage amplifying circuits 104 and the plurality of second voltage amplifying circuits 106 connect in series alternately. The operating principle of the input circuit 102 shown in FIG. 6 is as same as the input circuit 104 in FIG. 4, further description for the input circuit 102 is omitted. In this embodiment, the phase difference between the first clock signal CLK1 and CLK2 is 180°.

Each first voltage amplifying circuit 104 comprises a first input end 1041, a first output end 1042, a fourth transistor M4, a fifth transistor M5, and a sixth transistor M6. The transistors M4, M5, and M6 may be P-type TFT. A first end of the fourth transistor M4 electrically couples to the first input end 1041. The control end of the fourth transistor M4 also electrically couples to the first input end 1041 and the first clock signal CLK1 by means of a capacitor C3. A first end of the fifth transistor M5 electrically couples to first input end 1041. A control end of the transistor M5 electrically couples to the second end of the fourth transistor M4 and the second clock signal CLK2 by means of a capacitor C4. A first end of the sixth transistor M6 electrically couples to the first input end 1041. A second end of the sixth transistor M6 is electrically coupled to the first output end 1042. A control end of the transistor M6 electrically couples to the second end of the transistor M5 and the first clock signal CLK1 by means of a capacitor C5. Each first voltage amplifying circuit 104 is used for lowering the voltage level of input at the first input end 1041 by an amplitude of the first clock signal CLK1, (for example 5V in this embodiment) and outputting the lowered voltage at first output end 1042.

Each second voltage amplifying circuit 106 comprises a second input end 1061, a second output end 1062, a seventh transistor M7, an eighth transistor M8, and a ninth transistor M9. The transistor M7, M8 and M9 may be P-type TFTs. A first end of the seventh transistor M7 electrically couples to the second input end 1061. A control end of the transistor M7 electrically couples to the second input end 1061 and the second clock signal CLK2 by means of a capacitor C6. A first end of the eighth transistor M8 electrically couples to the second input end 1061. A control end of the transistor M7 electrically couples to the second input end and the first clock signal CLK1 by means of a capacitor C7. A first end of the ninth transistor M9 electrically couples to the second input end 1062. A control end of the transistor MS electrically couples to the second input end 1062 and the second clock signal CLK2 by means of a capacitor C8. Each second voltage amplifying circuit 106 is used for lowering the voltage level of input at the second input end 1061 by an amplitude of the first clock signal CLK2, (for example 5V in this embodiment) and outputting the lowered voltage at second output end 1062.

For each first voltage amplifying circuit 104, the voltage difference between the input voltage of the first input end 1041 and the output voltage of the first output end 1042 is the amplitude of the first clock signal CLK1. Similarly, for each second voltage amplifying circuit 106, the voltage difference between the input voltage of the second input end 1061 and the output voltage of the second output end 1062 is the amplitude of the second clock signal CLK2. Note that, the first input end 1041 of the first voltage amplifying circuit 104 electrically couples to the output end of the input circuit 102 or the second output end 1062 of one of the second voltage amplifying circuits 106. The first input end 1042 of the first voltage amplifying circuit 104 electrically couples to the signal output end Vout or the second input end 1061 of one of the second voltage amplifying circuits 106. The second input end 1061 of the second voltage amplifying circuit 106 electrically couples to the output end of input circuit 102 or the first output end 1042 of one of the first voltage amplifying circuits 104. The second output end 1062 of the second voltage amplifying circuit 106 electrically couples to the signal output end Vout or the first input end 1041 of one of the first voltage amplifying circuit 104.

Figure 7:
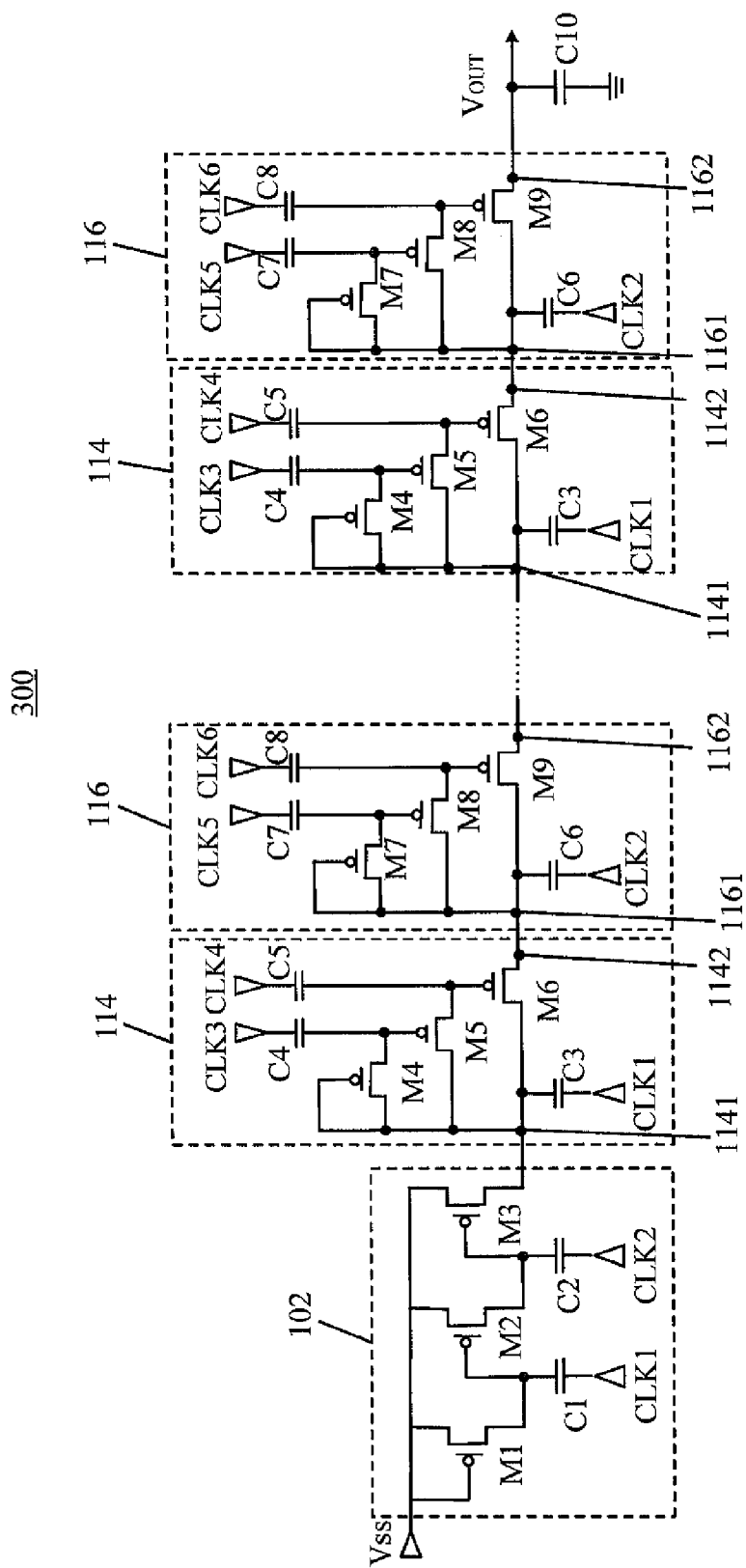
FIG. 7 shows a circuit diagram of the negative voltage converter according to third preferred embodiment of the present invention.

FIG. 7 shows a circuit diagram of the negative voltage converter 300 according to third preferred embodiment of the present invention. The negative voltage converter 300 comprised a signal input end, a signal output end, an input circuit 102, a plurality of first voltage amplifying circuits 114, and a plurality of second voltage amplifying circuits 116. The plurality of first voltage amplifying circuits 114 and the plurality of second voltage amplifying circuits 116 connect in series alternately. Because the operating rule of input circuit 102 shown in FIG. 7 is as same as input circuit 102 in FIG. 4, further description for the input circuit 102 is omitted Each first voltage amplifying circuit 114 comprises a first input end 1141, a first output end 1142, a fourth transistor M4, a fifth transistor M5, and a sixth transistor M6. The transistors M4, M5, and M6 may be P-type TFTs.

The first input end of the fourth transistor M4 electrically couples to the first input end 1141. The control end of the fourth transistor M4 electrically couples to the first input end 1141 and the first clock signal CLK1 by means of a capacitor C3. The first input end of the transistor M5 electrically couples to the first input end 1141. The control end of the transistor M5 electrically couples to the second end of the fourth transistor M4 and the third clock signal CLK3 by means of a capacitor C4. The first input end and second input end of the transistor M6 electrically couple to the first input end 1141 and the first output 1142, respectively. The control end of the transistor M6 electrically couples to the second end of the transistor M5, and the fourth clock signal CLK4 by means of a capacitor C5. Preferably, the phase difference between the fourth clock signal CLK4 and the third clock signal CLK3 is 180°. The duty cycle of the third clock signal CLK3 is smaller than that of the first clock signal CLK1, while the duty cycle of the fourth clock signal CLK4 is greater than that of the first clock signal CLK1.

Each second voltage amplifying circuit 116 comprises a second input end 1161, a second output end 1162, a seventh transistor M7, an eighth transistor M8, and a ninth transistor M9. The transistors M7, M8, and M9 may be P-type TFT. The first input end of the seventh transistor M7 electrically couples to the second input end 1161. The control end of the transistor M7 electrically couples to the second input end 1161 and the second clock signal CLK2 by means of a capacitor C6. The first input end of the eighth transistor M8 electrically couples to the second input end 1161. The control end of the eighth transistor M8 electrically couples to the second end of the seventh transistor M7 and the fifth clock signal CLK5 by means of a the capacitor C7. The first input end and second input end of the ninth transistor M9 electrically couple to the first input end 1161 and the first output 1062, respectively. The control end of the transistor M9 electrically couples to the second end of the eighth transistor M8, and the sixth clock signal CLK6 by means of a capacitor C8. The phase difference between the sixth clock signal CLK6 and the fifth clock signal CLK5 is 180°. The duty cycle of the sixth clock signal CLK6 is smaller that of the second clock signal CLK2, while the duty cycle of the fifth clock signal CLK5 is greater than that of the second clock signal CLK2. Preferably, the sixth clock signal CLK6 and the third clock signal CLK3 have same waveform and duty cycle, while the fourth clock signal CLK4 and the fifth clock signal CLK5 have same waveform and duty cycle.

Figure 8:
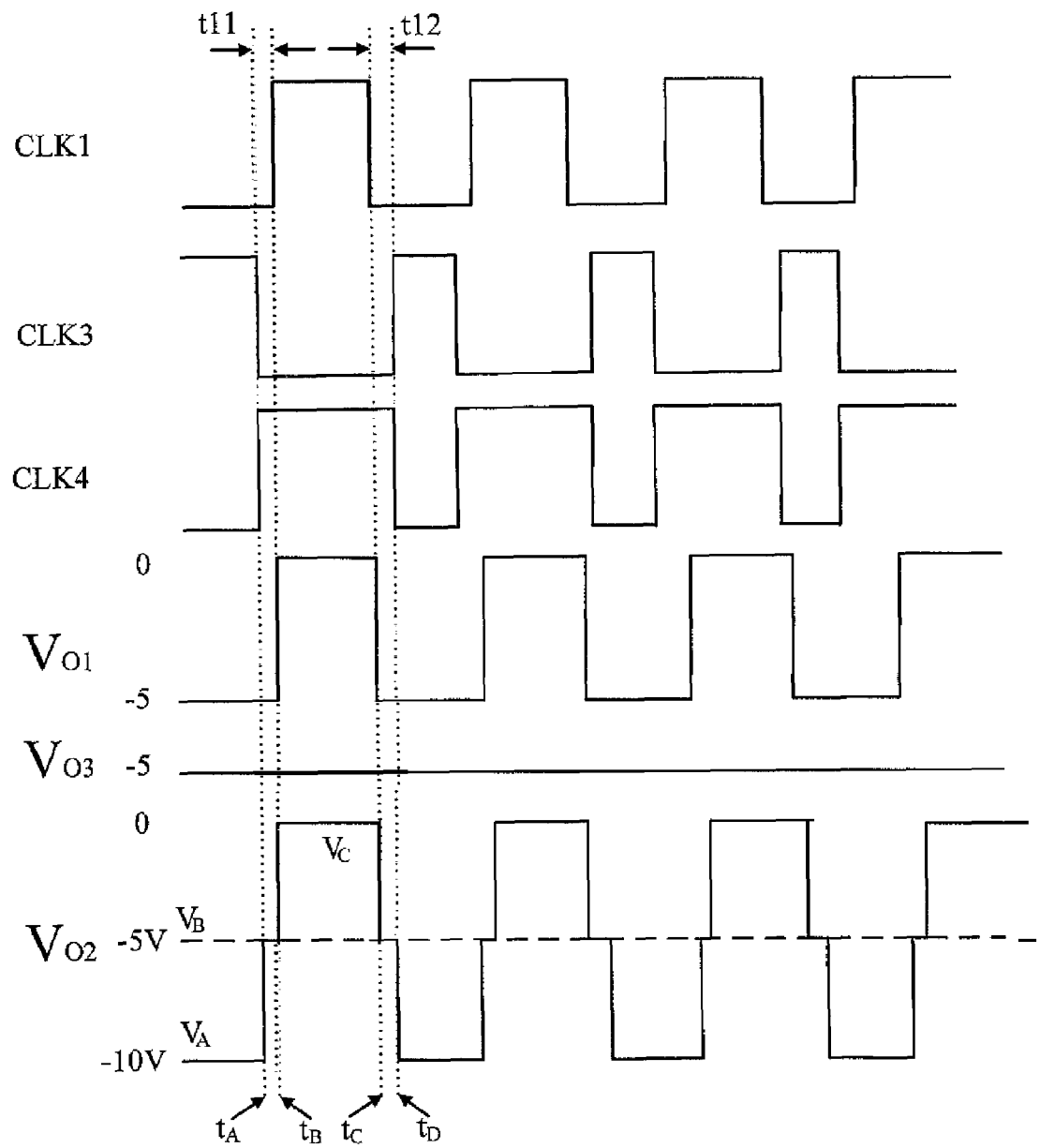
FIG. 8 shows respective waveforms $V_{O1}$, $V_{O2}$, $V_{O3}$ of the first end, control and second ends of the sixth transistor M6 depicted in FIG. 7.

Referring to FIG. 7 in conjunction with FIG. 8, FIG. 8 shows respective waveforms $V_{O1}$, $V_{O2}$, $V_{O3}$ of the first end, control and second ends of the sixth transistor M6 depicted in FIG. 7. When voltage $V_{O2}$ is higher than threshold voltage $V_{TH6}$ of the sixth transistor M6, the relationship between voltage $V_{O1}$ of first end, voltage $V_{O2}$ of the second end, and voltage $V_{O3}$ of the third end of M6 can represent as:

$V_{O3} \approx V_{O1}$, if $|V_{O2}| - |V_{TH6}| > |V_{O1}|$, $V_{O3} \approx V_{O2} - V_{TH6}$, if $|V_{O2}| - |V_{TH6}| < |V_{O1}|$.

If desiring voltage $V_{O3}$ applied on the first output end 1142 close to the low voltage level of the voltage $V_{O1}$, independent of the threshold voltage $V_{TH6}$, the low voltage level of the voltage $V_{O2}$ should meet a criteria: $|V_{O2}| > |V_{O1}| + |V_{TH6}|$.

Referring to FIG. 7 in conjunction with FIG. 8, the fourth clock signal CLK4 rises earlier than the first clock CLK1 by the time period t11, but falls later than the first clock signal CLK1 by the time period t12. Preferably, t11 and t12 is set between 10 nS and 5 us. During the time period t11, voltage $V_{O2}$ rises form $V_A$ (−10V) to $V_B$ (−5V). In the time period t12, voltage $V_{O2}$ declines form $V_C$ (0V) to $V_B$. On reaching the time point $t_A$, voltage level of the third clock signal CLK3 declines from the high voltage level to the low voltage level. As a result, the transistor M5 turns on. At this moment, on account of the leveling up the fourth clock signal CLK4 from the low voltage level to high voltage level, the transistor M6 is switch-off. At the same time, the voltage $V_{O2}$ rises from $V_A$ to $V_B$, such that the voltage $V_{O1}$ is at the voltage level of −5V. On reaching the time point $t_B$, the first clock signal CLK1 rises from low voltage level to high voltage level, and the voltage $V_{O1}$ rises to Vc on account of coupling effect. Therefore, the fifth transistor M5 is still turn-on. In this way, the voltage $V_{O2}$ has the same voltage level as the voltage $V_{O1}$, resulting in the sixth transistor M6 turning off. Therefore, the high voltage level $V_C$ of the voltage $V_{O1}$ doesn't output to the voltage $V_{O3}$, and accordingly the voltage $V_{O3}$ maintains at low voltage level.

On reaching the time point $t_C$, the voltage level of the first clock signal CLK1 falls from the high voltage to the low voltage level, and the voltage $V_{O1}$ declines to the voltage level $V_B$ on account of coupling effect. Because the transistor M5 still turns on, the voltage $V_{O2}$ declines to the voltage level $V_B$ of the voltage $V_{O3}$. On reaching time point $t_D$, the low voltage level of the third clock signal CLK3 levels up to high voltage level, hence, the transistor M5 switches off. The falling of the fourth clock signal CLK4 causes the voltage $V_{O2}$ to decline to the voltage level $V_A$ by coupling effect. The voltage drop is lower than $V_{O1}$ by about an amplitude of the fourth clock signal CLK4. As a result, even the deviation of threshold voltage exists in the transistor M6 on account of fabrication process, the output voltage $V_{O3}$ still can be maintained at a voltage level which is similar to the low voltage level of the voltage $V_{O1}$. Therefore, the first voltage amplifying circuit 114 is used for lowering the input voltage at the first input end 1141 by an amplitude of a first clock signal CLK1 and then outputting the lowered voltage at the first output end 1142. So, the output voltage of the first voltage amplifying circuit 114 is independent of the threshold voltage of the P-type transistor.

It is noted that the structure of the first voltage amplifying circuit 114 and second voltage amplifying circuit 116 is the same. In this embodiment, the first clock signal CLK1 is exactly inversed to the second clock signal CLK2, the sixth clock signal CLK6 and the third clock signal CLK3 are identical, and the fourth clock signal CLK4 and the fifth clock signal CLK5 are also identical. So, the operating rule of the first voltage amplifying circuit 114 and the second voltage amplifying circuit 114 are the same, except an opposed on-off time state of the ninth transistor M9 compared with the sixth transistor M6. As a result, the second voltage amplifying circuit 116 is also used for lowering the input voltage at the second input end 1161 by an amplitude of the second clock signal CLK2 and then outputting the lowered voltage at the second output end 1162. Similarly, the output voltage of the second voltage amplifying circuit 116 is independent of the threshold voltage of the P-type transistor.

According to present invention, the negative voltage converter outputs a desired negative voltage depending on the number of the first voltage amplifying circuits and the second voltage amplifying circuits connected in series. For example, if every clock signal are square wave with a amplitude 0-5V, the signal input end $V_{SS}$ of the negative converter is 0V, and a negative voltage converter comprises two first voltage amplifying circuits and two second voltage amplifying circuits, the negative voltage outputted at the signal output end $V_{OUT}$ will be a value of −20V (4*(−5)V).

As compared with prior art, the present invention provides a negative voltage converter which comprises an input circuit and a plurality voltage amplifying circuits. Even if there is a serious deviation of threshold voltage between P-type TFTs used in input circuits and voltage amplifying circuits, the output of the negative voltage converter still won't get heavy influence. Therefore, using this negative voltage converter according to present invention not only outputs a stable negative voltage DC supply but also avoids the deviation of the threshold voltage (Vth) of components from different fabrication process. At the same time, using the driving circuit of the negative voltage converter according to present invention can promote reliability and yield.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A negative voltage converter comprising:
a signal input end;
a signal output end;
an input circuit comprising:
- a first transistor comprising a first end, a second end, and a control end, the first end and the control end being electrically coupled to the signal input end;
- a second transistor comprising a first end, a second end, and a control end, wherein the first end of the second transistor is electrically coupled to the signal input end, and the control end of the second transistor is electrically coupled to a first clock signal and the second end of the first transistor; and
- a third transistor comprising a first end, a second end, and a control end, wherein the first end of the third transistor is electrically coupled to the signal input end, the control end of the third transistor is electrically coupled to a second clock signal and the second end of the second transistor;

a plurality of first voltage amplifying circuits, each comprising:
- a first input end electrically coupled to the first clock signal;
- a first output end;
- a fourth transistor comprising a first end, a second end, and a control end, wherein the first end and control ends of the fourth transistor are electrically coupled to the first input end;
- a fifth transistor comprising a first end, a second end, and a control end, wherein the first end of the fifth transistor is electrically coupled to the first input end, and the control end of the fifth transistor is electrically coupled to a third clock signal and the second end of the fourth transistor; and
- a sixth transistor comprising a first end, a second end, and a control end, wherein the first end of the sixth transistor is electrically coupled to the first input end, the control end of the sixth transistor is electrically coupled to a fourth clock signal and the second end of the fifth transistor; and a plurality of second voltage amplifying circuits, each comprising:
- a second input end electrically coupled to the second clock signal;
- a second output end;
- a seventh transistor comprising a first end, a second end, and a control end, wherein the first end and control ends of the seventh transistor are electrically coupled to the second input end;
- an eighth transistor comprising a first end, a second end, and a control end, wherein the first end of the eighth transistor is electrically coupled to the second input end, and the control end of the eighth transistor is electrically coupled to a fifth clock signal and the second end of the seventh transistor; and
- a ninth transistor comprising a first end, a second end, and a control end, wherein the first end of the ninth transistor is electrically coupled to the second input end, the second end of the ninth transistor is electrically coupled to the second output end, and the control end of the ninth transistor is electrically coupled to a sixth clock signal and the second end of the eighth transistor, wherein the first input end of one of the plurality of first voltage amplifying circuits is electrically coupled to the signal output end of the input circuit or the second output end of one of the plurality of second voltage amplifying circuits, and the first output end of one of the plurality of first voltage amplifying circuits is electrically coupled to the signal output end of the input circuit or the second input end of one of the plurality of second voltage amplifying circuits.

2. The negative voltage converter of claim 1, wherein the first, second, third, fourth, fifth, sixth, seventh, eighth and ninth transistors are P-type Thin Film Transistors (TFTs).

3. The negative voltage converter of claim 1, wherein a phase difference between the first clock signal and the second clock signal is 180 degrees.

4. The negative voltage converter of claim 1, wherein a phase difference between the third clock signal and the fourth clock signal is 180 degrees.

5. The negative voltage converter of claim 1, wherein a phase difference between the fifth clock signal and the sixth clock signal is 180 degrees.

6. The negative voltage converter of claim 1, wherein the second, fourth, and fifth clock signal have the same phase.

7. The negative voltage converter of claim 1, wherein a duty cycle of the third clock signal is shorter than a duty cycle of the first clock signal, while a duty cycle of the fourth clock signal is greater than the duty cycle of the first clock signal.

8. The negative voltage converter of claim 1, wherein a duty cycle of the sixth clock signal is shorter than a duty cycle of the second clock signal, while a duty cycle of the fifth clock signal is greater than the duty cycle of the second clock signal.

9. The negative voltage converter of claim 1, further comprising a first capacitor, wherein the control end of the second transistor is electrically coupled to the first clock signal by means of the first capacitor.

10. The negative voltage converter of claim 1, further comprising a second capacitor, wherein the control end of the third transistor is electrically coupled to the second clock signal by means of the second capacitor.

11. The negative voltage converter of claim 1, further comprising a third capacitor, wherein the control end of the fourth transistor is electrically coupled to the first clock signal by means of the third capacitor.

12. The negative voltage converter of claim 1, further comprising a fourth capacitor, wherein the control end of the fifth transistor is electrically coupled to the third clock signal by means of the fourth capacitor.

13. The negative voltage converter of claim 1, further comprising a fifth capacitor, wherein the control end of the sixth transistor is electrically coupled to the fourth clock signal by means of the fifth capacitor.

14. The negative voltage converter of claim 1, further comprising a sixth capacitor, wherein the control end of the seventh transistor is electrically coupled to the second clock signal by means of the sixth capacitor.

15. The negative voltage converter of claim 1, further comprising a seventh capacitor, wherein the control end of the eighth transistor is electrically coupled to the fifth clock signal by means of the seventh capacitor.

16. The negative voltage converter of claim 1, further comprising an eighth capacitor, wherein the control end of the ninth transistor is electrically coupled to the sixth clock signal by means of the sixth capacitor.

* * * * *